United States Patent
Yamane (10) Patent No.: US 10,990,152 B2
(45) Date of Patent: *Apr. 27, 2021

(54) INFORMATION PROCESSING APPARATUS WITH NON-CONTACT POWER SUPPLY

(71) Applicant: TOSHIBA TEC KABUSHIKI KAISHA, Tokyo (JP)

(72) Inventor: Yoichi Yamane, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,942

(22) Filed: Mar. 10, 2020

(65) Prior Publication Data

US 2020/0209937 A1 Jul. 2, 2020

Related U.S. Application Data

(63) Continuation of application No. 15/686,763, filed on Aug. 25, 2017, now Pat. No. 10,606,332.

(30) Foreign Application Priority Data

Sep. 1, 2016 (JP) .................................. 2016-170518

(51) Int. Cl.
*G06F 1/30* (2006.01)
*G06F 1/26* (2006.01)
(Continued)

(52) U.S. Cl.
CPC .............. *G06F 1/305* (2013.01); *G06F 1/263* (2013.01); *G06F 1/266* (2013.01); *G06F 1/3287* (2013.01);
(Continued)

(58) Field of Classification Search
CPC . G06F 1/26; G06F 1/263; G06F 1/266; G06F 1/28; G06F 1/305; G06F 1/387;
(Continued)

(56) References Cited

U.S. PATENT DOCUMENTS 9,787,130 B2 10/2017 Kim et al.
2011/0202777 A1 8/2011 Hijazi et al.
(Continued)

FOREIGN PATENT DOCUMENTS

EP 2472353 A1 7/2012
EP 3040805 A1 7/2016
JP 3179782 U 11/2012

OTHER PUBLICATIONS

Extended European Search Report dated Jan. 29, 2018 in related European Patent Application 17187880.4, 7 pages.

*Primary Examiner* — Jaweed A Abbaszadeh
*Assistant Examiner* — Brian J Corcoran
(74) *Attorney, Agent, or Firm* — Kim & Stewart LLP (57) ABSTRACT

An information processing apparatus includes a wired electric power supply connector configured for connection with a wired electric power supply to receive electric power therefrom, non-contact electric power supply connector configured for electric coupling with a non-contact electric power supply to receive electric power therefrom, and a processor. The processor selects, for electric power supplied to each component of the information processing apparatus, one of the wired electric power supply and the non-electric power supply, wherein the wired electric power supply is selected at a time of startup of the information processing apparatus, and the non-contact electric power supply is selected if an operation state of the information processing apparatus or the non-contact power supply meets a predetermined condition. The processor controls the wired electric power supply connector and the non-contact electric
(Continued)

power supply connector to supply electric power to each component based on the selection.

18 Claims, 4 Drawing Sheets

(51) Int. Cl.
*H02J 3/00* (2006.01)
*G06F 1/3287* (2019.01)
*G06F 1/3296* (2019.01)
*H02J 50/00* (2016.01)
*H02J 50/10* (2016.01)

(52) U.S. Cl.
CPC ............. *G06F 1/3296* (2013.01); *H02J 3/00* (2013.01); *H02J 3/005* (2013.01); *H02J 50/00* (2016.02); *H02J 50/10* (2016.02); *H02J 2207/40* (2020.01)

(58) Field of Classification Search
CPC ........ G06F 1/3296; G06F 1/30; G06F 9/4401; H02J 7/025; H02J 9/08; H02J 3/005; H02J 3/00; H02J 5/005; H02J 5/00; H02J 50/05; H02J 50/00; H02J 7/0055; H02J 50/10; H02J 2207/40; Y10S 323/901; Y10T 307/696
See application file for complete search history.

(56) References Cited

U.S. PATENT DOCUMENTS

| | | |
|---|---|---|
| 2012/0052923 A1 | 3/2012 | Park |
| 2014/0084854 A1 | 3/2014 | Eifuku |
| 2014/0097697 A1 | 4/2014 | Cho |
| 2014/0203661 A1 | 7/2014 | Dayan et al. |
| 2014/0368050 A1 | 12/2014 | Chun et al. |
| 2016/0077562 A1 | 3/2016 | Smith |
| 2016/0259649 A1 | 9/2016 | Poomachandran et al. |
| 2016/0294197 A1 | 10/2016 | Thompson et al. |
| 2016/0352156 A1 | 12/2016 | Desai et al. |

INFORMATION PROCESSING APPARATUS WITH NON-CONTACT POWER SUPPLY

CROSS-REFERENCE TO RELATED APPLICATION

This application is a continuation of U.S. patent application Ser. No. 15/686,763, filed Aug. 25, 2017, which application is based upon and claims the benefit of priority from Japanese Patent Application No. 2016-170518, filed Sep. 1, 2016, the entire contents of which are incorporated herein by reference.

FIELD

Embodiments described herein relate generally to an information processing apparatus with electric power supplied with a non-contact power supply.

BACKGROUND

An electric device may be provided with a non-contact power supply without using a power cable. For example, the non-contact power supply can provide electric power to various information processing apparatuses such as a PC (Personal Computer), a POS (Point of Sales) terminal and a printing apparatus.

However, the non-contact power supply does not provide electric power equal in amount to that provided through the power cable. Further, there is a case in which a large current, known as an inrush current, for charging a capacitor at the time of startup flows to a substrate on which a plurality of capacitors are mounted. In the non-contact power supply as described above, there is a case in which the information processing apparatus to which electric power is provided with such a power supply fails to start because most of the supplied electric power is consumed to generate the inrush current at the time a power source is turned on.

DETAILED DESCRIPTION

In accordance with an embodiment, an information processing apparatus includes a wired electric power supply connector configured for connection with a wired electric power supply to receive electric power therefrom, non-contact electric power supply connector configured for electric coupling with a non-contact electric power supply to receive electric power therefrom, and a processor. The processor selects, for electric power supplied to each component of the information processing apparatus, one of the wired electric power supply and the non-electric power supply, wherein the wired electric power supply is selected at a time of startup of the information processing apparatus, and the non-contact electric power supply is selected if an operation state of the information processing apparatus or the non-contact power supply meets a predetermined condition. The processor controls the wired electric power supply connector and the non-contact electric power supply connector to supply electric power to each component based on the selection. Hereinafter, with reference to the accompanying drawings, an information processing apparatus according to an embodiment is described in detail. The embodiment described below is merely an embodiment of the information processing apparatus and is not intended to limit the constitution and specification thereof.

Figure 1:
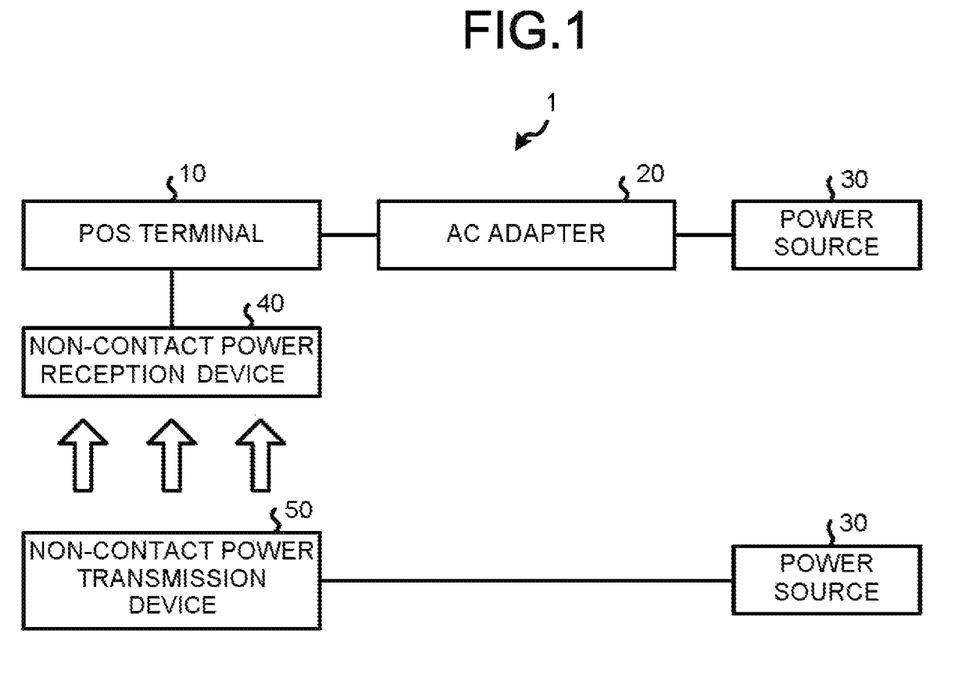
FIG. 1 is a diagram illustrating an example of a non-contact power supply system.

FIG. 1 illustrates an example of a non-contact power supply system 1. The non-contact power supply system 1 includes a POS (Point of Sales) terminal 10, an AC (Alternating Current) adapter 20, a power source 30, a non-contact power reception device 40, and a non-contact power transmission device 50.

The POS terminal 10 is an information processing apparatus that executes a sales data processing. The sales data processing includes registering a commodity, i.e., a sales object, and calculating a total amount and the like of the registered commodities. The AC adapter 20 converts electric power supplied from the power source 30 provided on the outside of the POS terminal 10 to electric power conforming to a specification of the POS terminal 10 to supply the converted electric power to the POS terminal 10. The power source 30 supplies a certain electric power. For example, the power source 30 is a so-called commercial power source. The AC adapter 20 converts an alternating current (AC) supplied from the power source 30 to a direct current (DC) to supply the converted current (DC) to the POS terminal 10.

The non-contact power reception device 40 receives the electric power transmitted from the non-contact power transmission device 50 in a non-contact manner. The non-contact power supply uses a well-known technology. The non-contact power may be supplied using an electromagnetic induction system, a magnetic field resonance system, or other systems. The non-contact power transmission device 50 transmits the electric power from the power source 30 in a non-contact manner. It is assumed that the non-contact power transmission device 50 uses the same non-contact power supply technology as the non-contact power reception device 40 so that the non-contact power reception device 40 can receive the electric power.

The POS terminal 10 can use electric power supplied by a power cable via the AC adapter 20 or the electric power supplied by the non-contact power supply.

Next, the hardware structure of the POS terminal 10 is described.

Figure 2:
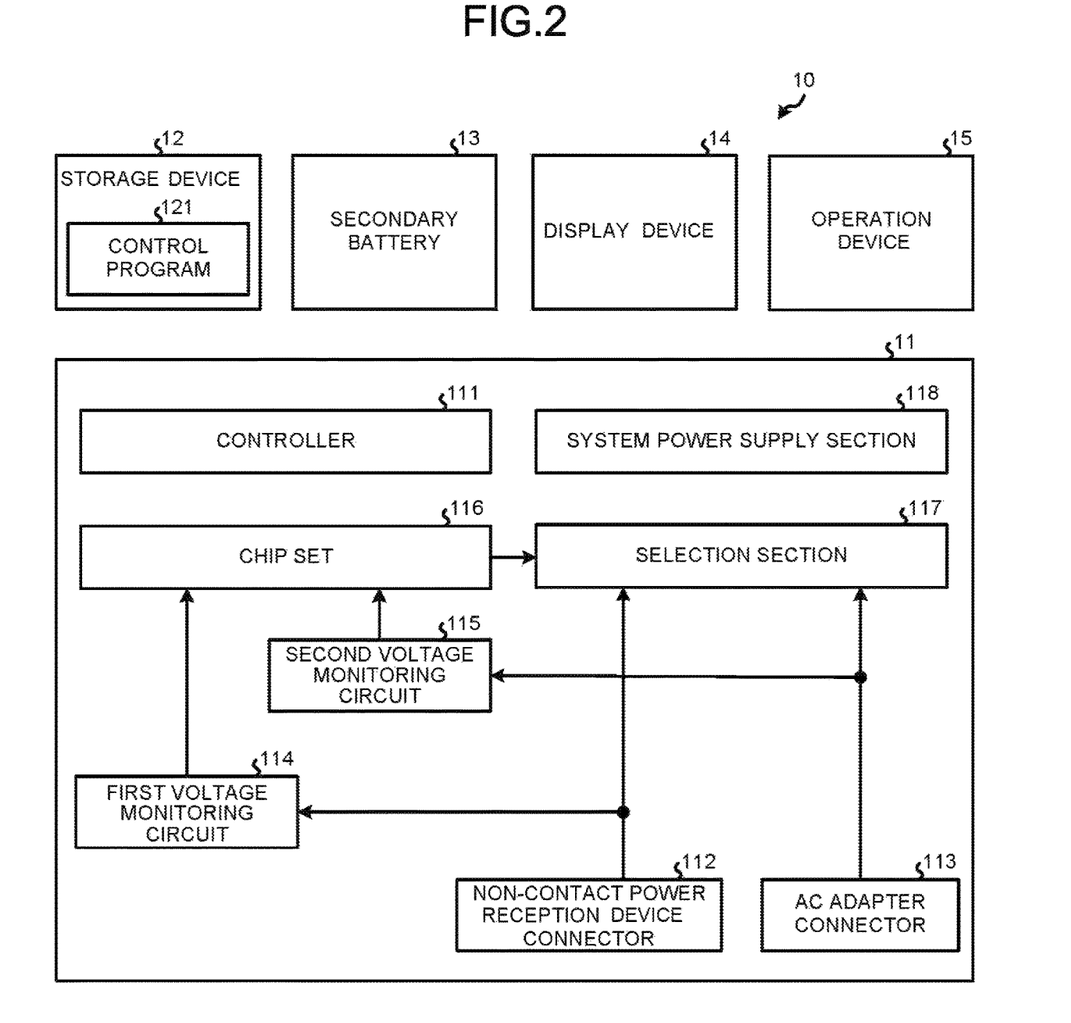
FIG. 2 is a block diagram illustrating an example of the hardware structure of a POS terminal.

FIG. 2 is a block diagram illustrating an example of the hardware structure of the POS terminal 10. The POS terminal 10 includes a processor 11, a storage device 12, a secondary battery 13, a display device 14 and an operation device 15. The processor 11 includes a controller 111, a non-contact power reception device connector 112, an AC adapter connector 113, a first voltage monitoring circuit 114, a second voltage monitoring circuit 115, a chip-set 116, a selection section 117 and a system power supply section 118.

The controller 111 controls the overall operation of the POS terminal 10 to realize various functions of the POS terminal 10. The controller 111 includes a CPU (Central Processing Unit), a ROM (Read Only Memory), and a RAM (Random Access Memory). The CPU collectively controls the operation of the POS terminal 10. The ROM is a storage medium that stores various programs and data. The RAM is a storage medium that temporarily stores various programs and rewrites various data. Then, the CPU executes the program stored in the ROM or the storage device 12 or the like with the RAM acting as a work area (working area).

The non-contact power reception device connector 112 connects the POS terminal 10 and the non-contact power reception device 40. In other words, the non-contact power reception device connector 112 supplies the electric power received by the non-contact power reception device 40 to the POS terminal 10.

The AC adapter connector 113 connects the POS terminal 10 and a wiring connected to the AC adapter 20. In other words, the AC adapter connector 113 supplies the electric power supplied from the AC adapter 20 to the POS terminal 10.

The first voltage monitoring circuit 114 monitors a voltage of the electric power supplied via the non-contact power reception device connector 112. For example, the first voltage monitoring circuit 114 outputs a voltage value of the electric power supplied via the non-contact power reception device connector 112 to the chip-set 116. Alternatively, the first voltage monitoring circuit 114 determines whether or not the voltage value of the electric power supplied via the non-contact power reception device connector 112 is greater than or equal to a threshold value. Then, the first voltage monitoring circuit 114 notifies the chip-set 116 of the determination result if the voltage value becomes greater than or equal to the threshold value.

The second voltage monitoring circuit 115 monitors a voltage of the electric power supped via the AC adapter connector 113. For example, the second voltage monitoring circuit 115 outputs a voltage value of the supplied electric power via the AC adapter connector 113. Alternatively, the second voltage monitoring circuit 115 determines whether or not the voltage value of the electric power supplied via the AC adapter connector 113 is greater than or equal to a threshold value. If it is determined that the voltage value becomes greater than or equal to the threshold value, the second voltage monitoring circuit 115 notifies the chip-set 116 of the determination result.

The chip-set 116 is a circuit group for controlling delivery of information from each component of the processor 11 under the control of the controller 111. In other words, the chip-set 116 controls the selection section 117 under the control of the controller 111.

The selection section 117 functions as a selection module of the present embodiment. The selection section 117 is an electric circuit for switching a supply source of the electric power to be supplied to the system power supply section 118. In other words, according to the control of the chip-set 116, the selection section 117 selects at least either the electric power supplied in the wired manner such as the AC adapter 20 or the electric power supplied in the manner of the non-contact power supply. The selection section 117 then supplies the selected electric power to the system power supply section 118.

The system power supply section 118 functions as a supply module of the present embodiment. The system power supply section 118 supplies the electric power supplied via the selection section 117 to each component of the POS terminal 10.

The storage device 12 is a storage device such as an HDD (Hard Disk Drive) and an SSD (Solid State Drive). The storage device 12 stores a control program 121. The control program 121 is an operating system or a program for realizing functions of the POS terminal 10. The control program 121 includes a program for realizing distinctive functions according to the present embodiment.

The secondary battery 13 stores electricity by charging. More specifically, the secondary battery 13 charges the supplied electric power if the electric power is supplied from the system power supply section 118. On the other hand, the secondary battery 13 supplies (discharges) the electric power used by each component of the POS terminal 10 if the electric power is not supplied from the system power supply section 118. The secondary battery 13 is, for example, a lithium-ion battery. The secondary battery 13 may be a type other than the lithium-ion battery.

The display device 14 is, for example, an LCD (liquid crystal display device). The display device 14 is not limited to the liquid crystal display device, but may be an organic EL display device. A touch panel may be laminated on the display device 14. Furthermore, the POS terminal 10 is not limited to having one display device 14, and may be provided with a plurality of display devices 14.

The operation device 15 is an input device such as a keyboard. The operation device 15 may be a touch panel laminated on the display device 14.

Figure 3:
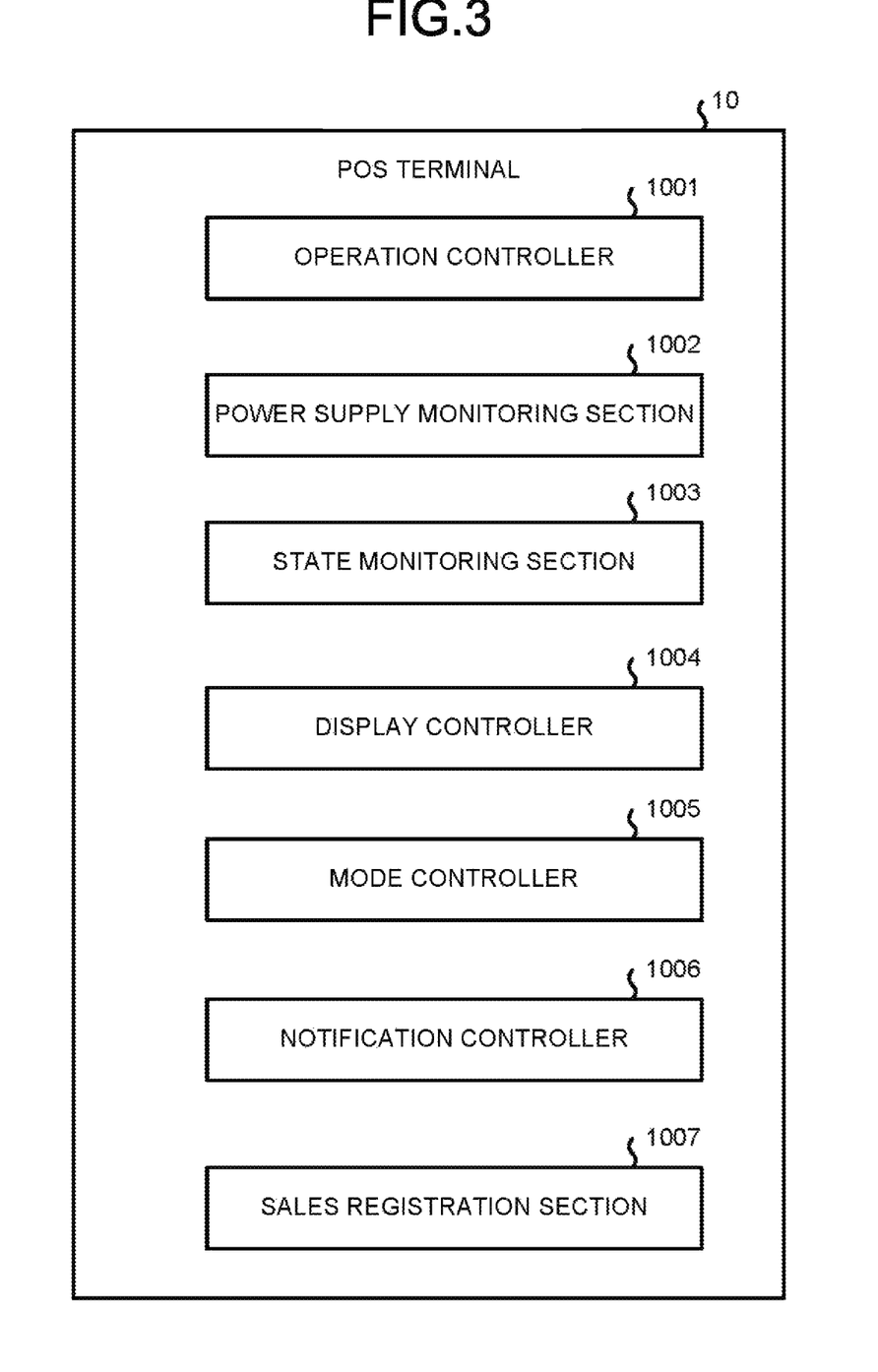
FIG. 3 is a block diagram illustrating functional components of the POS terminal.

Next, the functions of the POS terminal 10 are described. FIG. 3 is a block diagram illustrating functional components of the POS terminal 10.

The controller 111 of the POS terminal 10 operates according to the control program 121 to generate each functional section shown in FIG. 3. Specifically, the controller 111 of the POS terminal 10 includes, as functional sections, an operation controller 1001, a power supply monitoring section 1002, a state monitoring section 1003, a display controller 1004, a mode controller 1005, a notification controller 1006 and a sales registration section 1007.

The operation controller 1001 controls the operation device 15 to receive various operation instructions. For example, the operation controller 1001 receives an instruction for turning on the power source of the POS terminal 10. The operation controller 1001 also receives an instruction for turning off the power source of the POS terminal 10. The operation controller 1001 also receives an instruction for changing a power supply mode of the POS terminal 10.

The power supply monitoring section 1002 monitors a power supply state of the POS terminal 10. More specifically, the power supply monitoring section 1002 determines whether or not the voltage value of the supplied non-contact electric power is greater than or equal to a threshold value based on a monitoring result output from the first voltage monitoring circuit 114. The power supply monitoring section 1002 determines whether or not the voltage from the AC adapter 20 is greater than or equal to the threshold value based on the monitoring result output from the second voltage monitoring circuit 115.

If the power supply monitoring section 1002 determines that the voltage value of the supplied non-contact electric power is greater than or equal to the threshold value. The state monitoring section 1003 determines whether or not the operation state of the POS terminal 10 is stable. The state monitoring section 1003 can determine whether the operation state of the POS terminal 10 is stable according to various conditions. For example, the state monitoring section 1003 determines that the operation state of the POS terminal 10 is stable based on the condition that the operating system of the POS terminal 10 is started. Alternatively, the state monitoring section 1003 determines that the operation state of the POS terminal 10 is stable based on the condition that the voltage value provided to a predetermined part of the POS terminal 10 is greater than or equal to the threshold value. Alternatively, the state monitoring section 1003 determines that the operation state of the POS terminal 10 is stable based on the condition that a predetermined processing of the POS terminal 10 is executed. The state monitoring section 1003 determines that the POS terminal can be stably operated with the non-contact electric power if the power supply monitoring section 1002 determines that the voltage value of the supplied non-contact electric power supplied is greater than or equal to the threshold value and the operation state of the POS terminal 10 is stable.

The display controller 1004 functions as a display control module of the present embodiment. The display controller 1004 controls the display device 14 to display various screens. For example, the display controller 1004 displays a mode change acceptance screen if the power supply monitoring section 1002 determines that the voltage value of the supplied non-contact electric power is greater than or equal to the threshold value and the state monitoring section 1003 determines that the operation state of the POS terminal 10 is stable. The mode change acceptance screen is a screen for accepting a change of the power supply mode to the non-contact power supply mode. In other words, the mode change acceptance screen indicates that the POS terminal can be operated with the non-contact electric power. The mode change acceptance screen displays a message, such as, for example: "It is possible to switch to non-contact power supply mode from AC adapter power supply mode. Change to non-contact power supply mode or not?" A user can use the mode change acceptance screen to confirm whether to change or not.

The mode controller 1005 functions as a control module of the present embodiment. The mode controller 1005 controls the power supply mode of the POS terminal 10. The power supply mode includes, as stated above, the AC adapter power supply mode and the non-contact power supply mode. In the AC adapter power supply mode, the electric power is supplied from the power source 30 via the AC adapter 20. In the non-contact power supply mode, the electric power is supplied via the non-contact power supply. The display controller 1004 displays the mode change acceptance screen based on the condition that the operation state of the POS terminal or the non-contact power supply meets a predetermined condition. The mode controller 1005 switches the selection section 117 according to the power supply mode selected when the mode change acceptance screen is displayed. In other words, the mode controller 1005 sets the non-contact power supply mode if the operation controller 1001 receives an operation for instructing to use the non-contact power supply.

The selection section 117 selects either the electric power supplied via the non-contact power reception device connector 112 or the electric power supplied via the AC adapter connector 113 to supply the selected electric power to the system power supply section 118. In the case of the AC adapter power supply mode, the mode controller 1005 selects the electric power supplied via the AC adapter connector 113 through the selection section 117. On the other hand, in the case of the non-contact power supply mode, the mode controller 1005 selects the electric power supplied via the non-contact power reception device connector 112 through the selection section 117.

The initial value of the power supply mode is set to the AC adapter power supply mode. In other words, the selection section 117 selects the electric power supplied via the AC adapter connector 113 at the time of startup. Then, if the operation state of the POS terminal or the non-contact power supply meets the predetermined condition after the startup, the mode controller 1005 selects the non-contact electric power supplied through the non-contact power reception device connector 112 via the selection section 117.

The notification controller 1006 provides a notification that power is not supplied if the AC adapter 20 is not connected in the AC adapter power supply mode. The notification controller 1006 determines that the AC adapter 20 is not connected if the voltage value of the second voltage monitoring circuit 115 is equal to or less than the threshold value. The notification controller 1006 may provide the notification that power is not supplied according to various methods. For example, the notification controller 1006 may cooperate with the display controller 1004 to provide the notification by displaying a notification screen indicating that the AC adapter 20 is not connected and the power is not supplied.

The sales registration section 1007 controls the sales data processing. In other words, the sales registration section 1007 registers the commodity identified by the input commodity code as a commodity, i.e., a sales object. The sales registration section 1007 calculates the total amount of the commodities registered as the sales objects.

Figure 4:
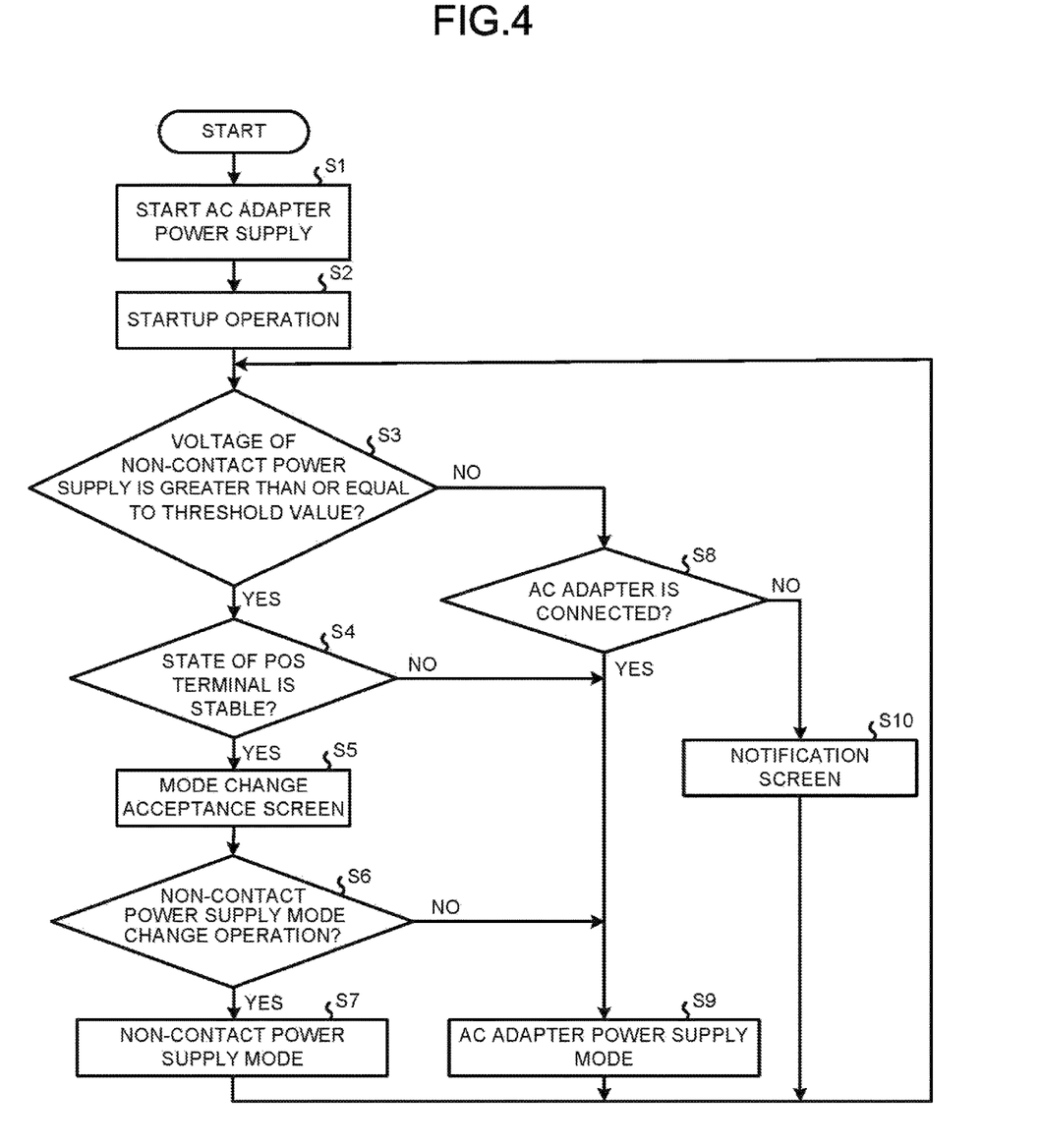
FIG. 4 is a flowchart illustrating an example of a power supply processing.

Next, the operation of each device of the non-contact power supply system 1 is described. A power supply processing executed by each device of the non-contact power supply system 1 according to the embodiment is described. Electric power is supplied to the POS terminal 10 in accordance with the power supply processing. FIG. 4 is a flowchart illustrating an example of the power supply processing executed by the non-contact power supply system 1 according to the embodiment.

The AC adapter 20 supplies the electric power fed from the power source 30 to the POS terminal 10 (Act S1). The POS terminal 10 receives an operation instruction for starting the POS terminal 10 (Act S2).

The power supply monitoring section 1002 of the POS terminal 10 determines whether or not the voltage of the non-contact power supply is greater than or equal to the threshold value (Act S3). If the voltage of the non-contact power supply is greater than or equal to the threshold value (Yes in Act S3), the state monitoring section 1003 of the POS terminal 10 determines whether or not the operation of the POS terminal 10 is stable (Act S4).

If the operation of the POS terminal 10 is not stable (No in Act S4), the POS terminal 10 proceeds to the processing in Act S9. On the other hand, if the operation of the POS terminal 10 is stable (Yes in Act S4), the display controller 1004 of the POS terminal 10 displays the mode change acceptance screen (Act S5).

The operation controller 1001 of the POS terminal 10 determines whether or not the operation instruction for changing to the non-contact power supply mode is input (Act S6). If the operation instruction for change to the non-contact power supply mode is input (Yes in Act S6), the mode controller 1005 of the POS terminal 10 switches the power supply mode to the non-contact power supply mode (Act S7). Then, the mode controller 1005 proceeds to the processing in Act S3.

On the other hand, if the operation instruction for changing to the non-contact power supply mode is not input (No in Act S6), the mode controller 1005 of the POS terminal 10 maintains the AC adapter power supply mode (Act S9). Then, the mode controller 1005 proceeds to the processing in Act S3.

If the voltage of the non-contact power supply is less than the threshold value in Act S3 (No in Act S3), the power supply monitoring section 1002 of the POS terminal 10 determines whether or not the electric power is supplied via the AC adapter 20 (Act S8).

If the electric power is supplied via the AC adapter 20 (Yes in Act S8), the POS terminal 10 proceeds to the processing in Act S9. On the other hand, if the electric power is not supplied via the AC adapter 20 (No in Act S8), the notification controller 1006 of the POS terminal 10 displays a notification screen (Act S10). The mode controller 1005 then proceeds to the processing in Act S3.

Then, the POS terminal 10 terminates the power supply processing if the power source of the POS terminal 10 is turned off.

As described above, according to the POS terminal 10 of the present embodiment, the selection section 117 supplies either one of the non-contact electric power and the wired electric power via the AC adapter 20 to the system power supply section 118. The system power supply section 118 then supplies the electric power to each component of the POS terminal 10. The controller 111 changes the power supply mode to the non-contact power supply mode in which each component is operated with the non-contact electric power if it is determined that the operation of the POS terminal 10 such as startup of the operating system is stable. In other words, the POS terminal 10 changes the power supply mode to the non-contact power supply mode after the inrush current occurs. Thus, the POS terminal 10 can be started more reliably.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

Further, in the above embodiment, a case in which the present invention is applied to the POS terminal 10, as an information processing apparatus, is described as an example. However, the present invention can be applied to various devices in which the inrush current occurs. For example, the present invention is applied to a self-service checkout POS terminal to which a customer executes the commodity registration operation and a checkout operation, a semi-self-service checkout POS terminal to which the customer executes the checkout operation, a printer, and an automatic change machine.

The programs executed by each device of the foregoing embodiment and the modification may be incorporated into a storage medium (ROM or storage device) of each device to be provided; however, the present invention is not limited to this. The programs may be recorded in a computer-readable recording medium such as a CD-ROM, a FD (Flexible Disk), a CD-R, a DVD (Digital Versatile Disk) and the like in the form of installable or executable file. Further, the storage medium is not limited to a medium independent from a computer or an embedded system and also contains a storage medium that stores or temporarily stores the programs by downloading the programs transmitted through a LAN (Local Area Network) or an Internet.

Further, the programs executed by each device of the foregoing embodiment and the modification is stored in a computer connected with a network and downloaded via the network to be supplied or may be supplied or distributed via the network such as the Internet.

What is claimed is:

1. An information processing apparatus capable of operating with electric power supplied from a wired electric power supply or a non-contact electric power supply, comprising:

a monitoring circuit electrically connected to a non-contact electric power supply connector and configured to monitor a voltage of electric power supplied from the non-contact electric power supply via the connector;

a selection circuit electrically connected to the non-contact electric power supply and the wired electric power supply; and a processor configured to:

control the monitoring circuit to output the voltage of electric power supplied from the non-contract non-contact electric power supply via the connector, determine whether or not a voltage level of the voltage output from the monitoring circuit is greater than or equal to a threshold level, and upon determining that the voltage level of the output voltage is greater than or equal to the threshold level, determine that one of the wired electric power supply and the non-contact electric power supply is to be used for supplying the electric power based on whether or not an operating system of the information processing apparatus has started, and control the selection circuit to supply the electric power from the determined one of the wired electric power supply and the non-contact electric power supply.

2. The information processing apparatus according to claim 1, wherein the processor is configured to when the voltage level of the output voltage is greater than or equal to the threshold level and the operating system has started, determine that the non-contact electric power supply is to be used, and when the voltage level of the output voltage is greater than or equal to the threshold level and the operating system has not started, determine that the wired electric power supply is to be used.

3. The information processing apparatus according to claim 2, wherein the processor is configured to determine that the wired electric power supply is to be used when the voltage level of the output voltage is not greater than or equal to the threshold level.

4. The information processing apparatus according to claim 1, further comprising:

an input device, wherein the processor is configured to determine that one of the wired electric power supply or the non-contact electric power supply is to be used for supplying the electric power further based on a user input received via the input device.

5. The information processing apparatus according to claim 4, further comprising:

a display device, wherein the processor is configured to, when the voltage level of the output voltage is greater than or equal to the threshold level and the operating system has started, generate a screen displayed on the display device, indicating that the information processing apparatus can be operated with the non-contact electric power supply, and through which the user input is accepted.

6. The information processing apparatus according to claim 1, further comprising:

a display device, wherein the processor is configured to upon determining that the voltage level of the output voltage is not equal to or greater than the threshold level, detect whether an AC adapter is connected, and when the AC adapter is not connected, generate a screen displayed on the display device and indicating that the AC adapter is not connected.

7. The information processing apparatus according to claim 6, further comprising:
a wired electric power supply connector connectable to the AC adapter.

8. The information processing apparatus according to claim 1, wherein
the information processing apparatus is a point of sales (POS) terminal, and
the processor is configured to perform registration processing for items to be purchased by a customer.

9. The information processing apparatus according to claim 1, further comprising:
a battery configured to be charged by electric power supplied from the wired electric power supply or the non-contact electric power supply.

10. A method for determining supplying electric power from one of a wired electric power supply and a non-contact electric power supply to operate an information processing apparatus, the method comprising:
controlling a monitoring circuit to output, via a non-contact electric power supply connector that is electrically connected to the monitoring circuit, a voltage of electric power supplied from the non-contact electric power supply via the connector;
determining whether or not a voltage level of the voltage output from the monitoring circuit is greater than or equal to a threshold level;
upon determining that the voltage level of the output voltage is greater than or equal to the threshold level, determining that one of the wired electric power supply and the non-contact electric power supply is to be used for supplying the electric power based on whether or not an operating system of the information processing apparatus has started; and
supplying the electric power from the determined one of the wired electric power supply and the non-contact electric power supply to operate the information processing apparatus.

11. The method according to claim 10, wherein
when the voltage level of the output voltage is greater than or equal to the threshold level and the operating system has started, the non-contact electric power supply is determined to be used, and
when the voltage level of the output voltage is greater than or equal to the threshold level and the operating system has not started, the wired electric power supply is determined to be used.

12. The method according to claim 11, wherein
the wired electric power supply is determined to be used when the voltage level of the output voltage is not greater than or equal to the threshold level.

13. The method according to claim 10, wherein
one of the wired electric power supply or the non-contact electric power supply is determined to be used for supplying the electric power further based on a user input received via an input device.

14. The method according to claim 13, further comprising:
generating a screen displayed on a display device, indicating that the information processing apparatus can be operated with the non-contact electric power supply, and through which the user input is accepted.

15. The method according to claim 10, further comprising:
upon determining that the voltage level of the output voltage is less than the threshold level, detecting whether an AC adapter is connected, and
when the AC adapter is not connected, generating a screen displayed on a display and indicating that the AC adapter is not connected.

16. The method according to claim 15, wherein
the information processing apparatus has a wired electric power supply connector connectable to the AC adapter.

17. The method according to claim 10, wherein
the information processing apparatus is a point of sales (POS) terminal, and
the method further comprises performing registration processing for items to be purchased by a customer.

18. The method according to claim 10, wherein
the information processing apparatus has a battery configured to be charged by electric power from the wired electric power supply or the non-contact electric power supply.

* * * * *